US009293047B2

(12) United States Patent
Raphael et al.

(10) Patent No.: US 9,293,047 B2
(45) Date of Patent: Mar. 22, 2016

(54) METHODS AND SYSTEM FOR MONITORING VEHICLE MOVEMENT FOR USE IN EVALUATING POSSIBLE INTERSECTION OF PATHS BETWEEN VEHICLE

(75) Inventors: Eric L. Raphael, Birmingham, MI (US); Frederick I. Johnson, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1951 days.

(21) Appl. No.: 12/350,266

(22) Filed: Jan. 8, 2009

(65) Prior Publication Data

US 2010/0171641 A1 Jul. 8, 2010

(51) Int. Cl.
*B60Q 1/00* (2006.01)
*G08G 1/16* (2006.01)

(52) U.S. Cl.
CPC ................ *G08G 1/167* (2013.01); *G08G 1/166* (2013.01)

(58) Field of Classification Search
None
See application file for complete search history.

(56) References Cited

U.S. PATENT DOCUMENTS

| | | | | |
|---|---|---|---|---|
| 7,145,441 | B2 * | 12/2006 | Knoop et al. | 340/435 |
| 7,295,925 | B2 * | 11/2007 | Breed et al. | 701/301 |
| 2002/0027503 | A1 * | 3/2002 | Higuchi | 340/436 |
| 2002/0032515 | A1 * | 3/2002 | Nakamura et al. | 701/96 |
| 2004/0098196 | A1 * | 5/2004 | Sekiguchi | 701/301 |
| 2008/0303696 | A1 * | 12/2008 | Aso et al. | 340/935 |

* cited by examiner

*Primary Examiner* — Curtis King
(74) *Attorney, Agent, or Firm* — Ingrassia Fisher & Lorenz, P.C.

(57) ABSTRACT

A method for monitoring vehicle movement for use in a first vehicle includes the steps of determining a lane location at a first point in time, determining a position of a second vehicle at a second point in time, the second point in time being subsequent to the first point in time, and determining a path of the second vehicle based at least in part on the position of the second vehicle and the lane location.

15 Claims, 3 Drawing Sheets

METHODS AND SYSTEM FOR MONITORING VEHICLE MOVEMENT FOR USE IN EVALUATING POSSIBLE INTERSECTION OF PATHS BETWEEN VEHICLE

TECHNICAL FIELD

The present invention generally relates to the field of vehicles and, more specifically, to methods and systems for monitoring movement of vehicles.

BACKGROUND OF THE INVENTION

Certain vehicles today include systems for monitoring movement of the vehicles and/or other nearby vehicles and providing pertinent information thereof to drivers of the vehicles. For example, a typical side blind zone alert (SBZA) system installed in a vehicle monitors nearby vehicles and provides an indication when nearby vehicles are in close proximity to the vehicle in which the side blind zone alert system is installed. In addition, a typical lane departure warning system (LDWS) installed in a vehicle monitors whether the vehicle is veering into an unintended lane. However, existing systems still may not be able to provide perfect information regarding the vehicle's path as it relates to other nearby vehicles, for example in situations in which the vehicle's path is likely to intersect with a path of one or more other nearby vehicles.

Accordingly, it is desirable to provide an improved method for monitoring a vehicle along with other nearby vehicles, for example in situations in which the vehicle's path is likely to intersect with a path of one or more other nearby vehicles. It is also desirable to provide an improved program product for such vehicle monitoring. It is further desirable to provide an improved system for such vehicle monitoring. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for monitoring vehicle movement for use in a first vehicle is provided. The method comprises the steps of determining a lane location at a first point in time, determining a position of a second vehicle at a second point in time, the second point in time being subsequent to the first point in time, and determining a path of the second vehicle based at least in part on the position of the second vehicle and the lane location.

In accordance with another exemplary embodiment of the present invention, a program product for monitoring vehicle movement for use in a first vehicle is provided. The program product comprises a program and a computer-readable signal-bearing media. The program is configured to at least facilitate determining a lane location at a first point in time, determining a position of a second vehicle at a second point in time, the second point in time being subsequent to the first point in time, and determining a path of the second vehicle based at least in part on the position of the second vehicle and the lane location. The computer-readable signal-bearing media bears the program.

In accordance with a further exemplary embodiment of the present invention, a system for monitoring vehicle movement for use in a first vehicle is provided. The system comprises a first detection unit, a second detection unit, and a processor. The first detection unit is configured to at least facilitate obtaining a lane location at a first point in time. The second detection unit is configured to at least facilitate obtaining a position of a second vehicle at a second point in time, the second point in time being subsequent to the first point in time. The processor is coupled to the first detection unit and the second detection unit. The processor is configured to at least facilitate determining a path of the second vehicle based at least in part on the position of the second vehicle and the lane location.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

Figure 1:
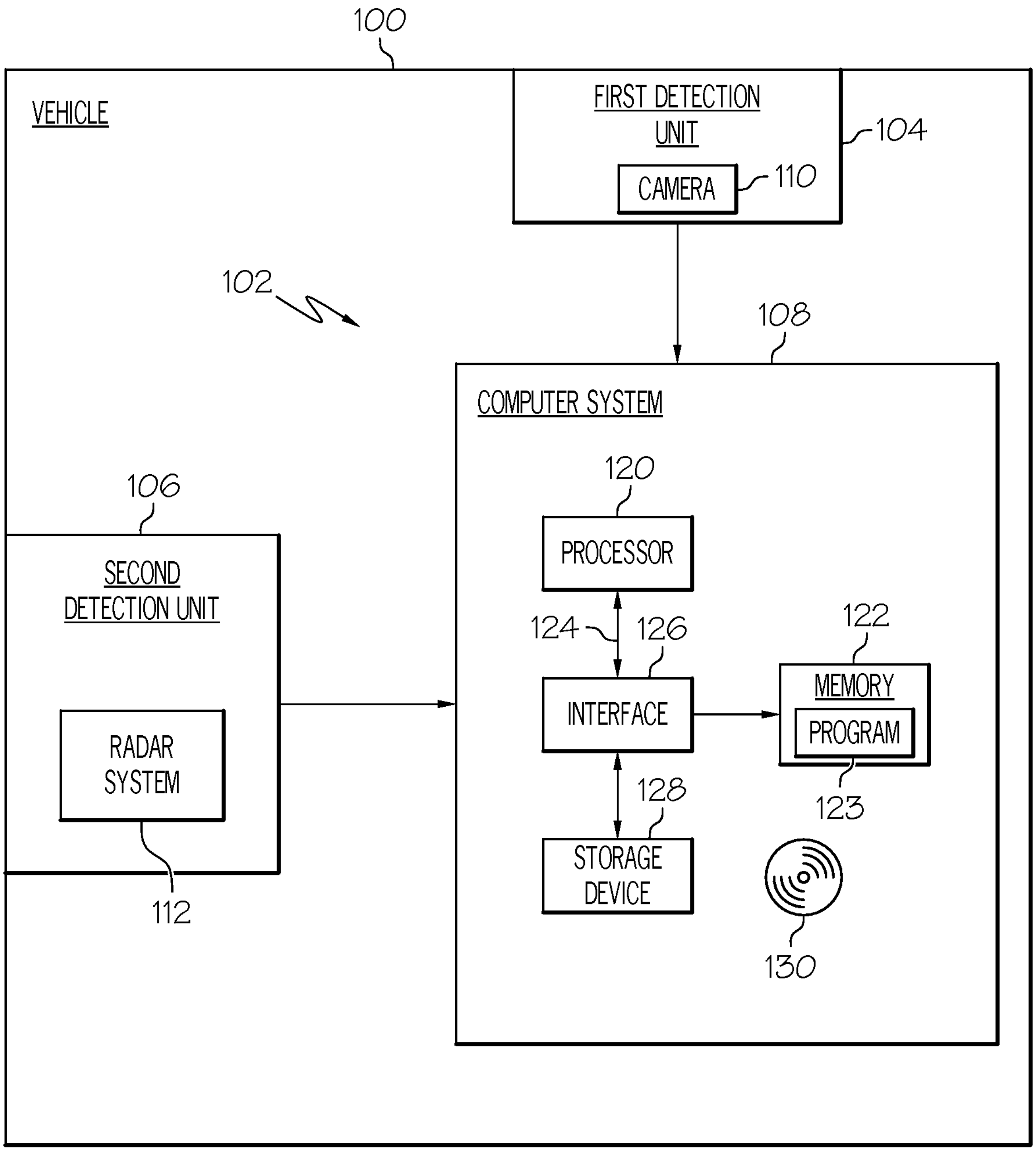
FIG. 1 is a functional block diagram of a system for monitoring vehicle movement, in accordance with an exemplary embodiment of the present invention.

FIG. 1 is a functional block diagram of a system 102 for monitoring vehicle movement, in accordance with an exemplary embodiment of the present invention. In the depicted embodiment, the system 102 is installed in a first vehicle 100. The system 102 monitors movement of the first vehicle 100 and one or more nearby, non-depicted vehicles that could potentially result in a collision with the first vehicle 100.

As depicted in FIG. 1, in one preferred embodiment, the system 102 includes a first detection unit 104, a second detection unit 106, and a computer system 108. The first detection unit 104 obtains locations of a lane in which the first vehicle 100 is traveling at various points in time and provides information pertaining thereto to the computer system 108 for further processing. In the depicted embodiment, the first detection unit 104 comprises a camera 110, preferably disposed near the front of the first vehicle 100 as part of a lane departure warning system (LDWS). In other embodiments, the first detection unit 104 may comprise a laser and/or one or more other devices for obtaining locations of the lane.

The second detection unit 106 obtains a position of one or more nearby vehicles at various points in time and provides information pertaining thereto to the computer system 108 for further processing. In the depicted embodiment, the second detection unit 106 comprises a radar system 112, preferably disposed on a passenger's side and a driver's side of the first vehicle 100 as part of a side blind zone alert (SBZA) system. In other embodiments, the second detection unit 106 may comprise a camera, an infrared device, a laser, and/or a combination thereof.

In the depicted embodiment, the computer system 108 is coupled to the first detection unit 104 and the second detection unit 106. The computer system 108 receives the information from the first detection unit 104 and the second detection unit 106 regarding the locations of the lane and the positions of the nearby vehicle, respectively, determines a path of the nearby vehicles using this information, determines a path of the first vehicle 100, compares the path of the first vehicle 100 and the nearby vehicles, and provides a warning if the respective paths of the first vehicle 100 and one or more nearby vehicles will intersect in a manner that will result in a collision between the first vehicle 100 and the one or more nearby vehicles if the first vehicle 100 and the nearby vehicles continue in their respective paths, all in accordance with the steps of the process 200 of FIG. 2 described further below.

In the depicted embodiment, the computer system 108 includes a processor 120, a memory 122, a computer bus 124, an interface 126, and a storage device 128. In addition, while the first detection unit 104 and the second detection unit 106 are depicted outside the computer system 108, it will be appreciated that one or both of the first detection unit 104 and the second detection unit 106 may be a part of the computer system 108 in various embodiments.

The processor 120 performs the computation and control functions of the computer system 108 or portions thereof, and may comprise any type of processor or multiple processors, single integrated circuits such as a microprocessor, or any suitable number of integrated circuit devices and/or circuit boards working in cooperation to accomplish the functions of a processing unit. During operation, the processor 120 executes one or more programs 123 preferably stored within the memory 122 and, as such, controls the general operation of the computer system 108.

In a preferred embodiment, the processor 120 receives the above-described information from the first detection unit 104 and the second detection unit 106 regarding the locations of the lane and the positions of the nearby vehicles, respectively, determines a path of the nearby vehicles using this information, determines a path of the first vehicle 100, compares the path of the first vehicle 100 and the nearby vehicles, and provides a warning if the respective paths of the first vehicle 100 and one or more nearby vehicles are likely to intersect in a manner that will result in a collision between the first vehicle 100 and the one or more nearby vehicles if the first vehicle 100 and the nearby vehicles continue in their respective paths. In so doing, the processor 120 preferably executes one or more programs 123 stored in the memory 122 in conducting the steps of the process 200 depicted in FIG. 2 and described further below in connection therewith.

As referenced above, the memory 122 stores a program or programs 123 that execute one or more embodiments of processes such as the process 200 described below in connection with FIG. 2 and/or various steps thereof and/or other processes, such as those described elsewhere herein. The memory 122 can be any type of suitable memory. This would include the various types of dynamic random access memory (DRAM) such as SDRAM, the various types of static RAM (SRAM), and the various types of non-volatile memory (PROM, EPROM, and flash). It should be understood that the memory 122 may be a single type of memory component, or it may be composed of many different types of memory components. In addition, the memory 122 and the processor 120 may be distributed across several different computers that collectively comprise the computer system 108. For example, a portion of the memory 122 may reside on a computer within a particular apparatus or process, and another portion may reside on a remote computer.

The computer bus 124 serves to transmit programs, data, status and other information or signals between the various components of the computer system 108. The computer bus 124 can be any suitable physical or logical means of connecting computer systems and components. This includes, but is not limited to, direct hard-wired connections, fiber optics, infrared and wireless bus technologies.

The interface 126 allows communication to the computer system 108, for example from a vehicle occupant, a system operator, and/or another computer system, and can be implemented using any suitable method and apparatus. In certain embodiments, the interface 126 provides the information from the first and second detection units 104, 106 to the processor and provides any warnings or other instructions from the processor 120 directly or indirectly to the driver and/or other occupants of the first vehicle 100 and/or any nearby vehicles. The interface 126 can include one or more network interfaces to communicate within or to other systems or components, one or more terminal interfaces to communicate with technicians, and one or more storage interfaces to connect to storage apparatuses such as the storage device 128.

The storage device 128 can be any suitable type of storage apparatus, including direct access storage devices such as hard disk drives, flash systems, floppy disk drives and optical disk drives. In one exemplary embodiment, the storage device 128 is a program product from which memory 122 can receive a program 123 that executes one or more embodiments of the process 200 of FIG. 2 and/or steps thereof as described in greater detail further below. In one preferred embodiment, such a program product can be implemented as part of, inserted into, or otherwise coupled to the system 102. As shown in FIG. 1, the storage device 128 can comprise a disk drive device that uses disks 130 to store data. As one exemplary implementation, the computer system 108 may also utilize an Internet website, for example for providing or maintaining data or performing operations thereon.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 130), and transmission media such as digital and analog communication links. It will similarly be appreciated that the computer system 108 may also otherwise differ from the embodiment depicted in FIG. 1, for example in that the computer system 108 may be coupled to or may otherwise utilize one or more remote computer systems and/or other control systems.

Figure 2:
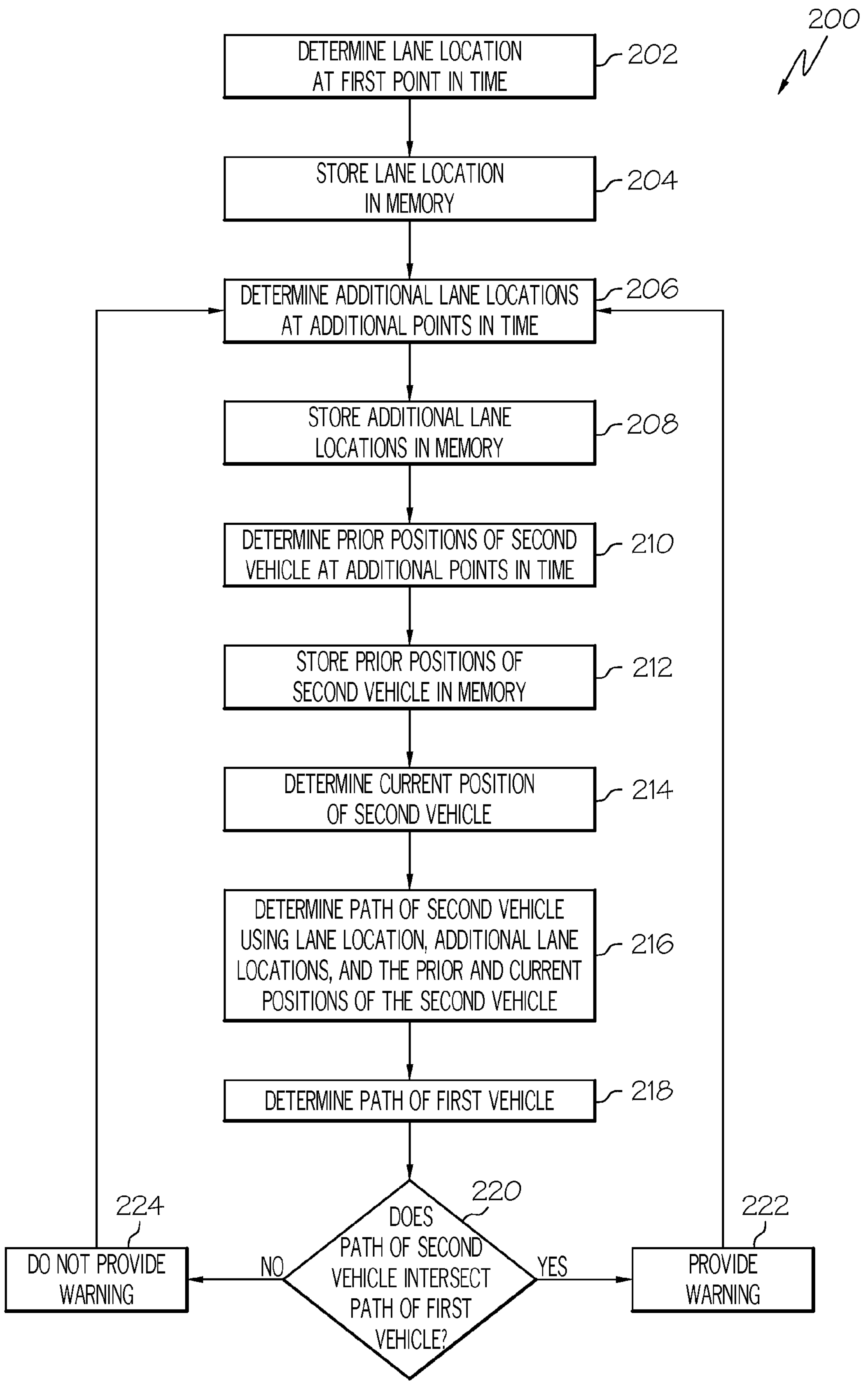
FIG. 2 is a flowchart of a process for monitoring vehicle movement, and that can be implemented in connection with the system of FIG. 1, in accordance with an exemplary embodiment of the present invention.

FIG. 2 is a flowchart of a process 200 for monitoring vehicle movement, in accordance with an exemplary embodiment of the present invention. In a preferred embodiment, the process 200 can be implemented in connection with the system 102 of FIG. 1 and/or through program products that can be utilized in connection therewith. However, it will be appreciated that in various embodiments the process 200 may also be utilized in connection with any number of different types of systems and/or other devices.

As depicted in FIG. 2, the process 200 includes the step of determining a lane location at a first point in time (step 202). In a preferred embodiment, this lane location is determined by the processor 120 of FIG. 1 based on lane location information that is obtained by the first detection unit 104 of FIG. 1 and provided to the processor 120 by the first detection unit 104. In one preferred embodiment, the lane location comprises a location or position of a lane in which a first vehicle (such as the first vehicle 100 of FIG. 1) is traveling, as determined by camera 110 of FIG. 1 positioned at a front end of the first vehicle 100 of FIG. 1. Also in one preferred embodiment, the camera 110 of FIG. 1, preferably positioned at the front end of the first vehicle 100 of FIG. 1, obtains the values of the lane location in step 202.

The lane location from step 202 is stored in memory (step 204). In a preferred embodiment, the lane location from step 202 is stored in the memory 122 of FIG. 1 by the processor 120 of FIG. 1 for subsequent processing and use by the processor 120 of FIG. 1.

In addition, a number of additional lane locations are determined at various additional points in time (step 206). In a preferred embodiment, these additional lane locations are determined by the processor 120 of FIG. 1 based on additional lane location information that is obtained by the first detection unit 104 of FIG. 1 and provided to the processor 120 by the first detection unit 104. In one preferred embodiment, the lane location comprises a location or position of a lane in which the first vehicle (such as the first vehicle 100 of FIG. 1) is traveling at such additional points in time. Also in one preferred embodiment, the camera 110 of FIG. 1, preferably positioned at the front end of the first vehicle 100 of FIG. 1, obtains the values of the lane location in step 202.

The additional lane locations from step 206 are also stored in memory (step 208). In a preferred embodiment, the additional lane locations from step 206 are stored in the memory 122 of FIG. 1 by the processor 120 of FIG. 1 for subsequent processing and use by the processor 120 of FIG. 1.

Accordingly, by determining the locations of the lane in which the first vehicle is traveling over a plurality of points in time, a lane location history is thereby generated with respect to the lane in which the first vehicle is traveling. Likewise, if the first vehicle switches lanes during this time, a lane location history is similarly generated of multiple lanes in which the first vehicle has been traveling over this time period. In either case, the lane location history is stored in memory for further use in processing and in monitoring movement of nearby vehicles, as will be described in greater further below.

Prior positions of a second vehicle are then determined (step 210). In a preferred embodiment, the prior positions of the second vehicle are determined by the processor 120 of FIG. 1 based upon values that are obtained by the second detection unit 106 of FIG. 1 as to the current position of the second vehicle and provided to the processor 120 by the second detection unit 106. In one such preferred embodiment, the values of the prior position of the second vehicle that are obtained by the radar system 112 of FIG. 1, for example as implemented in connection with a side blind zone alert (SBZA) system installed on the driver's side and the passenger's side of the first vehicle 100 of FIG. 1

In a preferred embodiment, the second vehicle comprises one or more nearby vehicles that could result in a collision with the first vehicle. Also in a preferred embodiment, the prior positions of the second vehicle are determined at least during the above-referenced additional points in time. By so doing, information as to the lane location and the additional lane locations of steps 202-208 from prior points in time can be matched up with locations of the second vehicle at subsequent points in time, in order to ascertain a relationship between the second vehicle's current position and the current location of the lane with respect to the second vehicle.

For example, if the second vehicle is trailing the first vehicle, the current location of the lane with respect to the second vehicle would be synonymous with the lane position as determined a short time prior by the first vehicle that is traveling ahead of the second vehicle. Accordingly, when combined with information as to a current position of the second vehicle (as will be described further below in connection with step 214), determinations can then be made as to whether the second vehicle is encroaching into a lane of the first vehicle or an intended lane of the first vehicle, for example as will be described further below in connection with step 220. In addition, in a preferred embodiment, positions of the second vehicle are obtained in step 210 for all points in time during operation of the process 200, including the first point in time referenced in step 204, for example to further assist in determining a magnitude and direction of movement of the second vehicle.

The positions of the second vehicle from step 210 are then stored in memory (step 212). In a preferred embodiment, the positions of the second vehicle from step 210 are stored in the memory 122 of FIG. 1 by the processor 120 of FIG. 1 for subsequent processing and use by the processor 120 of FIG. 1.

A current position of the second vehicle is then determined (step 214). In a preferred embodiment, the current position of the second vehicle is determined at or around a point in time in which an analysis is to be conducted as to whether the second vehicle is likely to cause a collision with the first vehicle. Also in a preferred embodiment, the current position of the second vehicle is determined by the processor 120 of FIG. 1 based upon values that are obtained by the second detection unit 106 of FIG. 1 as to the current position of the second vehicle and provided to the processor 120 by the second detection unit 106. In one such preferred embodiment, the values of the current position of the second vehicle are obtained by the radar system 112 of FIG. 1, for example as implemented in connection with a side blind zone alert (SBZA) system installed on the driver's side and the passenger's side of the first vehicle 100 of FIG. 1.

A path of the second vehicle is also determined (step 216). In one preferred embodiment, the path of the second vehicle comprises a direction of the second vehicle. Most preferably, the path of the second vehicle comprises a lane (marked or unmarked) in which the second vehicle is traveling or headed toward, or in which the driver of the second vehicle intends the second vehicle to travel into. In a preferred embodiment, the path of the second vehicle is determined by the processor 120 of FIG. 1.

Also in a preferred embodiment, the path of the second vehicle is determined in step 216 using the lane location of step 202, the additional lane locations of step 206, and the prior and current positions of the second vehicle of steps 210 and 214, respectively. Specifically, in one preferred embodiment, a direction and magnitude of movement of the second vehicle is obtained by comparing the positions of the second vehicle at multiple points in time, and the direction and magnitude of movement of the second vehicle is compared with the lane location information stored in memory, to thereby determine an intended lane of the second vehicle.

In so doing, the lane location information from one or more prior time periods is preferably compared with the current position of the second vehicle, so as to ascertain a relationship between the movement of the second vehicle and the lane in which the first vehicle is traveling or is attempting to travel into. For example, if the second vehicle is at least partially trailing the first vehicle, the lane information as to a prior point in time with respect to the first vehicle would be applicable to the lane information as to a subsequent point in time with respect to the second vehicle. In a preferred embodiment, this information is used in step 216 to determine a path of the second vehicle that comprises an intended lane of the second vehicle, that is, a lane in which the second vehicle is traveling or headed toward, or in which the driver of the second vehicle intends the second vehicle to travel into.

In addition, a path of the first vehicle is also determined (step 218). In one preferred embodiment, the path of the first vehicle comprises a direction of the first vehicle. Most preferably, the path of the first vehicle comprises a lane (marked or unmarked) in which the first vehicle is traveling or headed toward, or in which the driver of the first vehicle intends the first vehicle to travel into. In a preferred embodiment, the path of the first vehicle is determined by the processor 120 of FIG. 1.

Figure 3:
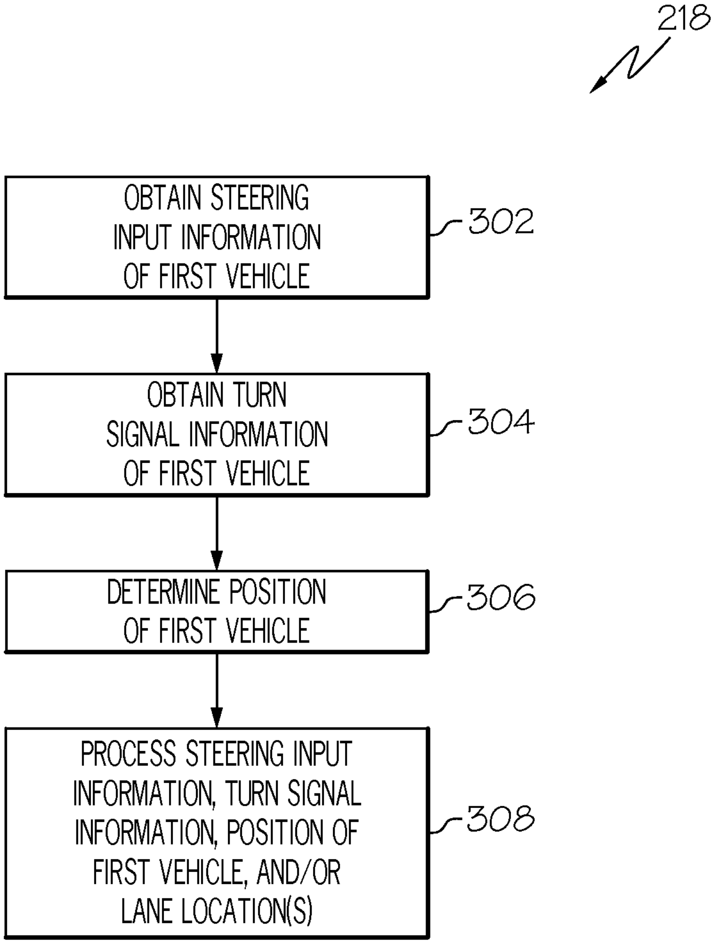
FIG. 3 is a flowchart of a step of the process of FIG. 2, namely the step of determining a path of a first vehicle, in accordance with an exemplary embodiment of the present invention.

Turning now to FIG. 3, a flowchart is provided with an exemplary process for determining the path of the first vehicle in step 218 of the process 200 of FIG. 2, in accordance with an exemplary embodiment of the present invention. It will be appreciated that various other processes and/or sub-steps may also be utilized in making the determination of the path of the first vehicle.

As depicted in FIG. 3, in this exemplary embodiment, steering input information is obtained from the first vehicle (step 302). In a preferred embodiment, the steering input information represents a desire of the driver of the first vehicle, as expressed via movement of the steering wheel, to remain in the same lane in which the first vehicle is traveling or to move the vehicle into a different lane. Also in a preferred embodiment, the steering input information is obtained by one or more non-depicted sensors coupled to a steering column of the first vehicle, and is provided to the processor 120 of FIG. 1 for processing for use in determining the path of the first vehicle during step 218 of the process 200 of FIG. 2.

Also as depicted in FIG. 3, in a preferred embodiment turn signal information is also obtained for the first vehicle (step 304). In a preferred embodiment, the turn signal information represents a desire of the driver of the first vehicle, as expressed via activation of a right hand turn signal or a left hand turn signal of the vehicle by the driver, to move the vehicle into a different lane. Also in a preferred embodiment, the turn signal information is obtained by one or more non-depicted sensors coupled to the turn signals or coupled to one or more switches for activating the turn signals, and is then provided to the processor 120 of FIG. 1 for processing for use in determining the path of the first vehicle during step 218 of the process 200 of FIG. 2.

In addition, a position of the first vehicle is preferably obtained (step 306). In a preferred embodiment, the position obtained in step 306 is a current position of the first vehicle. Also in a preferred embodiment, the position of the first vehicle 100 is determined by the processor 120 of FIG. 1 using information provided by a lane departure warning system including the first detection unit 104 of FIG. 1, and/or provided by a non-depicted global-positioning system and/or another type of positioning device.

The steering input information of step 302, the turn signal information of step 304, and the position of the first vehicle as determined in step 306 are then processed, preferably also using the lane location information of steps 202-208 of FIG. 1, in order to determine a path of the first vehicle (step 308). Similar to the determination of the path of the second vehicle, the path of the first vehicle preferably is determined so as to comprise a lane in which the first vehicle is traveling or headed toward, or a lane in which the driver of the first vehicle intends the first vehicle to travel into.

In a preferred embodiment, the determination of step 308 is made by the processor 120 of FIG. 1. It will be appreciated that in certain embodiments one or more of the values of the steering input information of step 302, the turn signal information of step 304, the position of the first vehicle of step 306, and the lane location information of steps 202-208 of FIG. 1, may not be necessary in determining the path of the first vehicle. For example, in certain embodiments, the path of the first vehicle may determined using the turn signal information alone, the steering input information alone, the position of the vehicle when combined with the lane locations alone, and/or one or more other combinations of these and/or other values, in various other embodiments of the present invention.

Returning now to FIG. 2, a determination is then made as to whether the path of the second vehicle from step 216 intersects the path of the first vehicle from step 218 (step 220). In one preferred embodiment, the path of the second vehicle is considered to be proximate to the path of the first vehicle if the lane of the second vehicle will intersect with the path of the first vehicle in a manner that is likely to lead to a collision between the first and second vehicles if the first and second vehicles remain at least substantially within their respective paths. Also in a preferred embodiment, the determination of whether the path of the second vehicle is likely to intersect the path of the first vehicle is made by the processor 120 of FIG. 1.

If it is determined in step 220 that the path of the second vehicle is likely to intersect the path of the first vehicle, then a warning is provided (step 222). The process then returns to step 206, and steps 206-222 continue to repeat until a determination is made in a subsequent iteration of step 220 that the path of the second vehicle is unlikely to intersect the path of the first vehicle (at which point the process 200 proceeds instead to step 224, as provided in FIG. 2 and described below).

In a preferred embodiment, the warning comprises audio and/or visual warnings for the driver of the first vehicle of a possible impending collision, so that the first driver can take appropriate evasive action. In certain embodiments, audio and/or visual warnings may also be provided to the driver of the second vehicle, and/or to the drivers of other nearby vehicles, so that such drivers of other nearby vehicles can similarly take evasive action or other appropriate measures to avoid a collision.

Conversely, if it is determined in any iteration of step 220 that the path of the second vehicle is unlikely to intersect the path of the first vehicle, then no warning is provided (step 224). Instead, the process then returns to step 206, and steps 206-220 and step 224 continue to repeat until a determination is made in a subsequent iteration of step 220 that the path of the second vehicle is likely to intersect the path of the first vehicle (at which point the process 200 proceeds instead to step 222, as provided in FIG. 2 and described above).

It will be appreciated that certain steps of the process 200 may vary from those depicted in FIG. 2 and described herein. It will be similarly appreciated that certain steps of the process 200 may be performed simultaneously and/or in an order different from that depicted in FIG. 2 and described herein.

Accordingly, improved methods, program products, and systems are provided for monitoring vehicle movement. The improved methods, program products, and systems combine lane history information with position information of a first vehicle and any nearby vehicles over multiple time periods in order to obtain information as to whether an intended lane or other path of any nearby vehicles are likely to intersect with an intended lane or other path of the first vehicle in which the improved methods, program, products, and systems are utilized or installed. In situations in which an intended lane or other path of any nearby vehicles are likely to intersect with an intended lane or other path of the first vehicle, appropriate warnings are provided to the drivers to allow the drivers to take evasive action or other measures to avoid a collision. This can in result in potentially fewer collisions and/or anxiety for the occupants of the vehicles.

It will be appreciated that, in various embodiments, the disclosed methods, program products, and systems may vary from those depicted in the figures and described herein. It will similarly be appreciated that, while the disclosed methods, program products, and systems are described above as being used in connection with automobiles such as sedans, trucks, vans, and sports utility vehicles, the disclosed methods, program products, and systems may also used in connection with any number of different types of vehicles, and in connection with any number of different systems thereof and environments pertaining thereto.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of monitoring vehicle movement for use in a first vehicle, the method comprising the steps of:

determining a lane location of the first vehicle at a first point in time;

determining a position of a second vehicle at a second point in time, the second point in time being subsequent to the first point in time;

determining additional lane locations of the first vehicle at a plurality of additional points in time, each of the additional points comprising a different intermediate point in time that is subsequent to the first point in time and prior to the second point in time;

determining additional positions of the second vehicle at the intermediate points in time; and determining, via a processor, a path of the second vehicle based at least in part on the position of the second vehicle at the second point in time, the additional positions of the second vehicle at the intermediate points in time, the lane location of the first vehicle at the first point in time, and the additional lane locations of the first vehicle at the intermediate points in time, for use in evaluating possible intersection of paths between the first and second vehicles, wherein determining a position of the second vehicle comprises correlating prior lane locations of the first vehicle with subsequent positions of the second vehicle, to ascertain a relationship between a current position of the second vehicle and a current location of the lane with respect to the second vehicle.

2. The method of claim 1, further comprising the step of:

storing the lane location, the additional location, the position, and the additional positions in memory in the first vehicle.

3. The method of claim 1, further comprising the step of:

comparing the path of the second vehicle with a path of the first vehicle using the lane location of the first vehicle at the first point in time, the position of the second vehicle at the second point in time, the additional positions of the second vehicle at the intermediate points in time, and the additional lane locations of the first vehicle at the intermediate points in time.

4. The method of claim 3, further comprising the step of:

providing a warning if the respective paths of the first vehicle and the second vehicle will intersect in a manner that will result in a collision between the first and second vehicles if the first and second vehicles continue in their respective paths using the lane location of the first vehicle at the first point in time, the position of the second vehicle at the second point in time, the additional positions of the second vehicle at the intermediate points in time, and the additional lane locations of the first vehicle at the intermediate points in time.

5. The method of claim 1, wherein:

the step of determining the lane location comprises the step of determining the lane location at the first point in time, the lane location being at least partially in front of the first vehicle at the first point in time and at least partially behind the first vehicle at the second point in time.

6. The method of claim 1, further comprising:

determining an intended lane of the second vehicle based at least in part on the relationship.

7. The method of claim 1, further comprising:

determining if the second vehicle is encroaching on the lane of the first vehicle, if the second vehicle is trailing the first vehicle, based at least in part on a lane position of the first vehicle as identified using a camera on the first vehicle and a current position of the second vehicle that is identified using a radar system on the first vehicle shortly after the identification of the lane position of the first vehicle by the camera.

8. A system for monitoring vehicle movement for use in a first vehicle, the system comprising:

a first detection unit configured to at least facilitate obtaining a lane location of the first vehicle at a first point in time;

a second detection unit configured to at least facilitate obtaining a position of a second vehicle at a second point in time, the second point in time being subsequent to the first point in time;

wherein:

the first detection unit is further configured to at least facilitate obtaining additional lane locations of the first vehicle at a plurality of additional points in time, each of the additional points comprising a different intermediate point in time that is subsequent to the first point in time and prior to the second point in time; and the second detection unit is further configured to at least facilitate obtaining additional positions of the second vehicle at the intermediate points in time; and a processor coupled to the first detection unit and the second detection unit and configured to at least facilitate determining a path of the second vehicle based at least in part on the position of the second vehicle at the second point in time, the additional positions of the second vehicle at the intermediate points in time, the lane location of the first vehicle at the first point in time, and the additional lane locations of the first vehicle at intermediate points in time, for use in evaluating possible intersection of paths between the first and second vehicles, wherein the processor is further configured to at least facilitate determining if the second vehicle is encroaching on the lane of the first vehicle, if the second vehicle is trailing the first vehicle, based at least in part on a lane position of the first vehicle as identified using a camera on the first vehicle and a current position of the second vehicle that is identified using a radar system on the first vehicle shortly after the identification of the lane position of the first vehicle by the camera.

9. The system of claim 8, wherein further comprising:

a memory disposed within the first vehicle, the memory configured to at least facilitate storing the lane location, the additional location, the position, and the additional positions.

10. The system of claim 8, wherein:

the processor is further configured to at least facilitate comparing the path of the second vehicle to a path of the first vehicle using the lane location of the first vehicle at the first point in time, the position of the second vehicle at the second point in time, the additional positions of the second vehicle at the intermediate points in time, and the additional lane locations of the first vehicle at the intermediate points in time.

11. The system of claim 10, wherein the processor is further configured to at least facilitate providing a warning if the respective paths of the first vehicle and the second vehicle will intersect in a manner that will result in a collision between the first and second vehicles if the first and second vehicles continue in their respective paths using the lane location of the first vehicle at the first point in time, the position of the second vehicle at the second point in time, the additional positions of the second vehicle at the intermediate points in time, and the additional lane locations of the first vehicle at the intermediate points in time.

12. The system of claim 8, wherein the lane location is at least partially in front of the first vehicle at the first point in time and at least partially behind the first vehicle at the second point in time.

13. The system of claim 8, wherein:

the first detection unit comprises a lane departure warning system; and the second detection unit comprises a side blind zone alert system.

14. The system of claim 13, wherein:

the lane departure warning system comprises a camera disposed on a front side of the vehicle; and the side blind zone alert system comprises a radar system disposed on a passenger side or driver side of the vehicle.

15. A method of monitoring vehicle movement for use in a first vehicle, the method comprising the steps of:

determining a lane location of the first vehicle at a first point in time;

determining a position of a second vehicle at a second point in time, the second point in time being subsequent to the first point in time;

determining additional lane locations of the first vehicle at a plurality of additional points in time, each of the additional points comprising a different intermediate point in time that is subsequent to the first point in time and prior to the second point in time;

determining additional positions of the second vehicle at the intermediate points in time;

determining, via a processor, a path of the second vehicle based at least in part on the position of the second vehicle at the second point in time, the additional positions of the second vehicle at the intermediate points in time, the lane location of the first vehicle at the first point in time, and the additional lane locations of the first vehicle at the intermediate points in time, for use in evaluating possible intersection of paths between the first and second vehicles; and determining if the second vehicle is encroaching on the lane of the first vehicle, if the second vehicle is trailing the first vehicle, based at least in part on a lane position of the first vehicle as identified using a camera on the first vehicle and a current position of the second vehicle that is identified using a radar system on the first vehicle shortly after the identification of the lane position of the first vehicle by the camera.

* * * * *